TELEVISION RECEIVER

Filed Jan. 7, 1946 4 Sheets-Sheet 1

INVENTOR
LOUIS F. MAYLE

BY [signature]

ATTORNEY

TELEVISION RECEIVER

Filed Jan. 7, 1946 4 Sheets-Sheet 2

INVENTOR
LOUIS F. MAYLE

BY [signature]

ATTORNEY

Feb. 27, 1951 L. F. MAYLE 2,543,037

TELEVISION RECEIVER

Filed Jan. 7, 1946 4 Sheets-Sheet 3

INVENTOR
LOUIS F. MAYLE

BY [signature]

ATTORNEY

Feb. 27, 1951 L. F. MAYLE 2,543,037

TELEVISION RECEIVER

Filed Jan. 7, 1946 4 Sheets-Sheet 4

INVENTOR
LOUIS F. MAYLE

BY [signature]

ATTORNEY

Patented Feb. 27, 1951

2,543,037

UNITED STATES PATENT OFFICE 2,543,037

TELEVISION RECEIVER

Louis F. Mayle, Fort Wayne, Ind., assignor, by mesne assignments, to Farnsworth Research Corporation, a corporation of Indiana Application January 7, 1946, Serial No. 639,607

2 Claims. (Cl. 178—7.5)

This invention relates generally to television systems, and more particularly relates to a system for transmitting both video and related audio signals on a common carrier, receiving the modulated carrier and reproducing the video and audio signals.

It is a conventional practice to provide separate sound and picture carriers for transmitting video and simultaneously occurring audio information. A television system of this type has a number of inherent drawbacks. Two transmitters are required for feeding separate sound and picture transmitting antennae which in turn radiate the two modulated carriers into space. At the receiver separate intermediate-frequency amplifier stages must be provided for the intermediate-frequency carrier waves carrying respectively the audio and video signals. Furthermore, the sound modulated carrier occupies a certain frequency band so that only a portion of a television channel of given width is available for transmitting the video signals.

A number of television systems have been suggested for transmitting both video and audio signals on a common carrier. Thus, it has been proposed to transmit the sound intermittently during the high frequency blanking periods, that is during the retrace interval of the scanning beam of the picture pickup tube. To this end certain portions of the sound are selected during the scanning interval as well as portions of the sound occurring during the blanking interval. These distinct portions of sound are delayed or stored and transmitted together during the blanking interval by modulating the carrier by the sound at that time. This system requires delaying or storing means for the sound at the transmitter and at each receiver.

In accordance with another suggestion, a subcarrier is modulated by the audio signals, and the main carrier is modulated simultaneously by the video signal and the modulated subcarrier. However, the frequency of the audio modulated subcarrier must be above the highest frequency of the video signal so that the frequency band required for the modulated main carrier of this system is comparatively wide. Another television system has been proposed where the amplitude of the television carrier is modulated by the video signal during the scanning interval. Then the carrier is shifted in frequency to provide a line synchronizing signal. The frequency of the shifted carrier is modulated by the audio signal which is, therefore, transmitted intermittently during the line synchronizing periods. All these prior systems require comparatively complicated apparatus at each receiver for segregating the video and audio signals.

It is an object of the present invention, therefore, to provide a method of and system for transmitting both video and audio signals on a common carrier wave.

Another object of the invention is to provide a television system where a common carrier wave is modulated simultaneously and continuously by both video and audio signals and where frequency selective means are provided at the receiver for segregating the sound and picture information.

A further object of the invention is to provide, in a television receiver, means for restoring the low frequency video information which is carried by the blanking signal.

In accordance with the present invention, there is provided apparatus for transmitting intelligence comprising sources for developing a first signal, a second signal and a carrier wave. Means are provided for suppressing all frequencies below a predetermined frequency from the first signal to derive a high frequency component thereof as well as means for suppressing all frequencies above the predetermined frequency from the second signal to derive a low frequency component thereof. Further means are provided for simultaneously and continuously modulating the amplitude of the carrier wave by the high frequency component of the first signal and the low frequency component of the second signal. Finally, means are provided for transmitting the thus obtained modulated carrier wave.

In accordance with a preferred embodiment of the invention, apparatus for transmitting pictures and simultaneously occurring sound comprises sources for developing a video signal, an audio signal, a blanking signal including pulses and a carrier wave. Means are provided for segregating the video signal into a high frequency component containing only frequencies above a predetermined frequency and into a low frequency component containing only frequencies below the predetermined frequency. Means are provided for modulating the amplitude of the blanking pulses by the low frequency video component as well as means for combining the high frequenccy video component, the audio signal and the modulated blanking pulses to derive a composite signal. Further means are provided for modulating the amplitude of the carrier wave by the composite signal and means for transmitting the modulated carrier wave.

For a better understanding of the invention, together with other and further objects thereof, reference is made to the following description, taken in connection with the accompanying drawings, and its scope will be pointed out in the appended claims.

Figure 1:
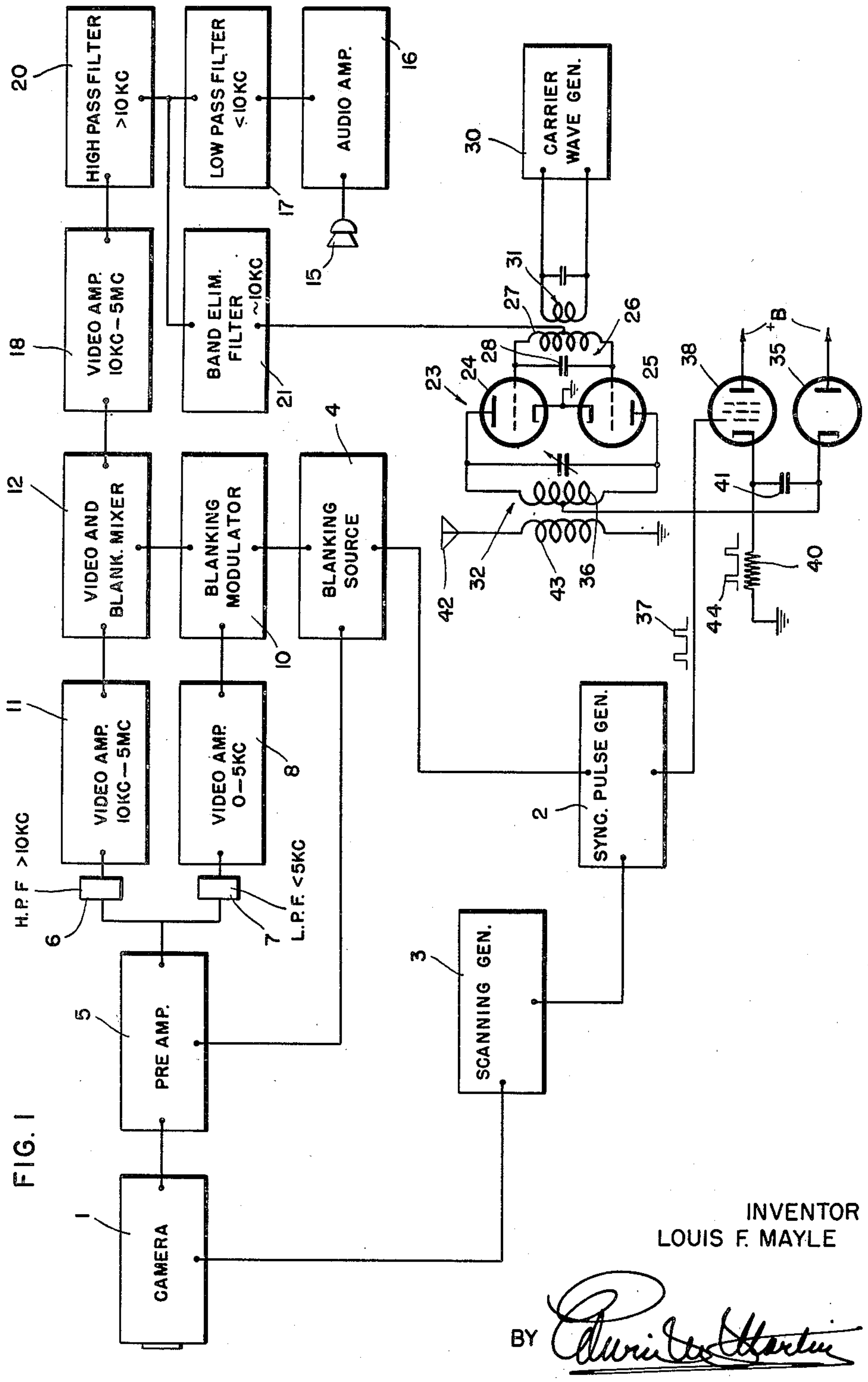
Fig. 1 is a schematic representation, partly in block form, of a television transmitter embodying the present invention.

Referring to Fig. 1 of the drawings, there is illustrated a television transmitter including television camera 1, arranged for developing a video signal. It is to be understood that any conventional picture pickup tube may be used as television camera 1 which has been shown diagrammatically. The transmitter further includes synchronizing pulse generator or timing unit 2 which is arranged for developing synchronizing pulses at the line and field frequency. The synchronizing pulses developed by generator 2 control scanning generator 3 which develops line and field scanning waves for deflecting the scanning beam of television camera 1. Blanking source 4 controlled by synchronizing pulse generator 2 develops blanking pulses at the line frequency.

The video signal developed by television camera 1 is amplified by preamplifier 5 which is controlled by the blanking pulses developed by blanking source 4 for the purpose of blanking out the video signal during the blanking interval. Television camera 1 is arranged to develop a video signal which includes the low frequency video information as well as the so-called D. C. information. The low frequency and D. C. video information may be derived directly from a picture pickup tube of the image dissector type. If a pickup tube of the charge storage type is used, the low frequency and D. C. video information may be obtained from an auxiliary photoelectric cell in a manner well known in the art.

The preamplified video signal derived from amplifier 5 is now divided into a high frequency video component and a low frequency video component. To this end there are provided high pass filter 6 and low pass filter 7. High pass filter 6 is preferably arranged to pass frequencies in excess of 10 kilocycles, while low pass filter 7 may pass frequencies below 5 kilocycles. The low frequency video component is amplified by video amplifier 8 which preferably has a flat band pass from zero to 5 kilocycles. The amplified low frequency video information is now utilized for modulating the amplitude of the blanking pulses developed by source 4. Although the video signal is blanked out during the blanking interval, it will be understood that the low frequency video component is still effective during the blanking interval to modulate the amplitude of the blanking pulses. This may be explained by the fact that the video signal is segregated into a high frequency and a low frequency video component so that a signal will be present in the low frequency video channel even though the sum of the high frequency and of the low frequency video components is zero during the blanking interval. The amplitude of the blanking pulses is now modulated in accordance with the low frequency video information in blanking modulator 10. Thus, it will be appreciated that the low frequency video information, that is, the video information below a predetermined frequency, is now carried by the amplitude modulated blanking pulses.

The high frequency video information, that is the video signal above a predetermined frequency, is amplified by video amplifier 11 which preferably has a flat band pass between 10 kilocycles and about 5 megacycles and is mixed with the amplitude modulated blanking signal in video and blanking mixer 12. The output signal derived from mixer 12 is a composite signal containing the video signal above the predetermined frequency and the amplitude modulated blanking pulses carrying the low frequency video information.

According to the present television standards as adopted by the Radio Manufacturers Association the frequency of the blanking pulses is 15,750 cycles per second corresponding to 60 fields per second, each frame comprising two fields, and 525 lines per frame. Accordingly, it will be appreciated that the composite signal developed by video and blanking mixer 12 contains only frequencies in excess of 10 kilocycles; the frequency range between 5 and 10 kilocycles is, preferably, suppressed from the video signal so that the modulation products of the blanking pulses and the low frequency video component do not contain frequencies below 10 kilocycles. Alternatively, it is feasible to modulate the amplitude of the blanking pulses by the low frequency video component containing frequencies up to 10 kilocycles and to suppress all frequencies below 10 kilocycles from the output of blanking modulator 10.

Figure 6:
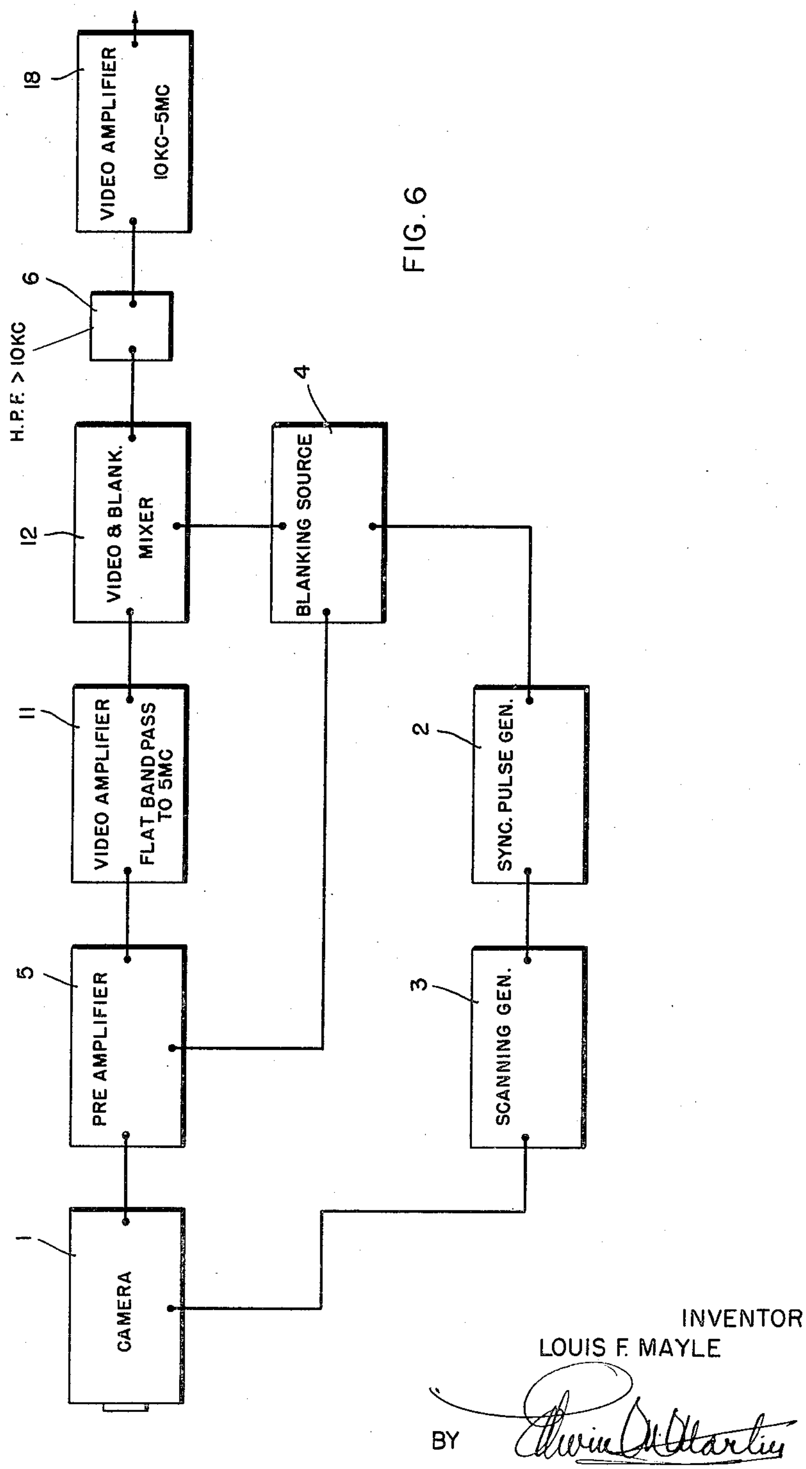
Fig. 6 is a block diagram of a modification of the television transmitter of Fig. 1.

Instead of modulating the amplitude of the blanking pulses in accordance with the low frequency video information as described, the same results may be obtained in the following manner. All that is required is to suppress the low frequency video information from the composite signal developed by video and blanking mixer 12 and to carry this low frequency video information by the amplitude modulated blanking pulses. As illustrated in Fig. 6 which may be substituted for dotted block 19 of Fig. 1 low pass filter 7, video amplifier 8 and blanking modulator 10 may be omitted. Video amplifier 11 may have a flat band pass up to approximately 5 megacycles. Blanking source 4 is accordingly directly connected to video and blanking mixer 12. The blanking signal is mixed with the video signal, which contains all frequencies, in a conventional manner. The amplitudes of the blanking pulses are accordingly equal.

High pass filter 6 may now be connected across the output of video and blanking mixer 12. High pass filter 6 thus functions to suppress the low frequency video information from the composite output signal, that is, all frequencies below 10 kilocycles. This, in turn, causes the amplitudes of the blanking pulses to vary because the low frequency video information has been removed from the composite output signal. The low frequency video information is therefore carried by the amplitude modulated blanking pulses. Accordingly the output signal derived from high pass filter 6 connected across the output of video and blanking mixer 12 as shown in Fig. 6 is the same as that developed by video and blanking mixer 12 when connected as illustrated in Fig. 1.

In accordance with the present invention, the composite signal comprising the high frequency video component and the amplitude modulated blanking pulses is mixed with an audio signal which is related to or accompanies the video signal. To this end there is provided microphone 15 for developing an audio signal which is amplified by audio amplifier 16. Preferably, all frequencies in excess of 10 kilocycles are suppressed from the audio signal by low pass filter 17 connected to the output of audio amplifier 16. Video amplifier 18 preferably has a flat band pass between 10 kilocycles and about 5 megacycles and is connected to the output of video and blanking mixer 12 for further amplification of the video and blanking signals. The output signal of video amplifier 18 is passed through high pass filter 20 which suppresses all frequencies below 10 kilocycles.

The output signals derived from high pass filter 20 and low pass filter 17 are fed to band elimination filter 21 which is arranged to have its maximum attenuation at frequencies of approximately 10 kilocycles. The composite signal obtained from band elimination filter 21 comprises the high frequency video component containing frequencies in excess of 10 kilocycles, the blanking pulses modulated by the low frequency video component and also containing only frequencies in excess of 10 kilocycles and the audio signal which contains frequencies below 10 kilocycles.

It is to be understood that it may not be necessary to suppress the high frequency component of the audio signal. It is well known that most conventional microphones and audio amplifiers will not pass frequencies higher than about 12 to 15 kilocycles. The actual limit of the audible perception of most people is in the neighborhood of 15 kilocycles. Therefore, the audio signals may be amplified in audio amplifier 16 without using a low pass filter so that the highest audio frequency passed through audio amplifier 16 may be of the order of 12 to 15 kilocycles. In that case the high frequency video component should have its lowest frequency above the highest frequency of the audio signal derived from audio amplifier 16. Thus, high pass filter 8 may be arranged to pass only frequencies above the line frequency, that is above about 15 kilocycles. The low frequency video component which may contain all frequencies up to about 15 kilocycles may then be used for modulating the amplitude of the blanking pulses. It is essential, however, that the frequency ranges of the audio signal and the high frequency video component are not coextensive.

For the purpose of modulating the amplitude of a carrier wave by the combined audio and video signals as well as by the synchronizing signals, there is provided push-pull power amplifier 23. Power amplifier 23 comprises two tubes 24 and 25 having their cathodes grounded as shown. Resonant circuit 26, including inductance element 27 and condenser 28, is connected to the grids of tubes 24, 25. The composite signal obtained from band elimination filter 21 is connected to the mid point of inductance element 27 so that the grids of tubes 24, 25 are excited in phase thereby. Carrier wave generator 30 has its output connected to resonant circuit 31 magnetically coupled to inductance element 27 to drive the grids of tubes 24, 25 in phase opposition.

Push-pull amplifier 23 as described up to now operates in a conventional manner and its output may be derived across resonant output circuit 32 connected to the anodes of tubes 24, 25. The output signal developed in resonant output circuit 32 is a carrier wave having its amplitude modulated in accordance with the composite signal obtained from band elimination filter 21. This composite signal includes the audio signal, the high frequency video component and the blanking pulses having their amplitude modulated by the low frequency video component.

As is well understood in the art a composite video signal further includes synchronizing pulses at the line and field frequency. For the purpose of adding the synchronizing signals the amplitude of the carrier wave is modulated in accordance with the synchronizing signals by controlling the anode supply voltage of power amplifier 23. Normally, an anode supply voltage of predetermined magnitude is fed to the anodes of tubes 24, 25 through diode 35 having its anode connected to a suitable voltage source indicated at B+. The cathode of diode 35 is connected to the mid point of inductance element 36 forming part of resonant circuit 32.

The anode supply voltage is raised whenever a positive synchronizing pulse is developed by pulse generator 2, thereby to modulate the amplitude of the carrier wave by the synchronizing pulses perched on top of the amplitude modulated blanking pulses. For this purpose positive synchronizing pulses indicated at 37 are impressed upon the control grid of pentode 38 having its anode connected to a suitable voltage source indicated at B+. The cathode of pentode 38 is connected to ground through resistor 40. Condenser 41 couples the cathode of pentode 38 to the cathode of diode 35. The control grid of pentode 38 is normally biased beyond cutoff. However, whenever a positive synchronizing pulse 37 is impressed upon the control grid of pentode 38, the tube becomes conducting. The space current flowing from B+ to ground through pentode 38 and through resistor 40 will raise the potential of the cathode of tube 38. Consequently, upon the occurrence of a synchronizing pulse a positive pulse indicated at 44 is impressed upon condenser 41 and thus raises the anode supply voltage fed to the anodes of power amplifier tubes 24, 25. However, this voltage, which is added to the potential of the cathode of diode 35, can not cause current to flow through diode 35. The anode supply voltage of tubes 24, 25 may normally be of the order of 1,000 volts. Upon the arrival of a positive synchronizing pulse 37 the voltage of the cathode of pentode 38 may be raised to about 500 volts above ground so that the anode supply voltage impressed upon the anodes of power amplifier tubes 24, 25 is now of the order of 1,500 volts, thereby to raise the amplitude of the carrier wave in accordance with the synchronizing signals.

Control of the anode supply voltage of power amplifier 23 in accordance with the synchronizing signals has certain advantages. Thus, the synchronizing pulses need not be amplified because they serve only for controlling the space current in pentode 38 and, accordingly, the transmitter requires less equipment.

The output signal developed in resonant output circuit 32 is a carrier wave having its amplitude modulated in accordance with the composite signal derived from band elimination filter 21 and in accordance with the synchronizing signals. The thus obtained modulated carrier wave may be radiated into space by antenna 42 connected to inductance element 43 grounded as shown and magnetically coupled to inductance element 36 of resonant circuit 32.

Figure 2:
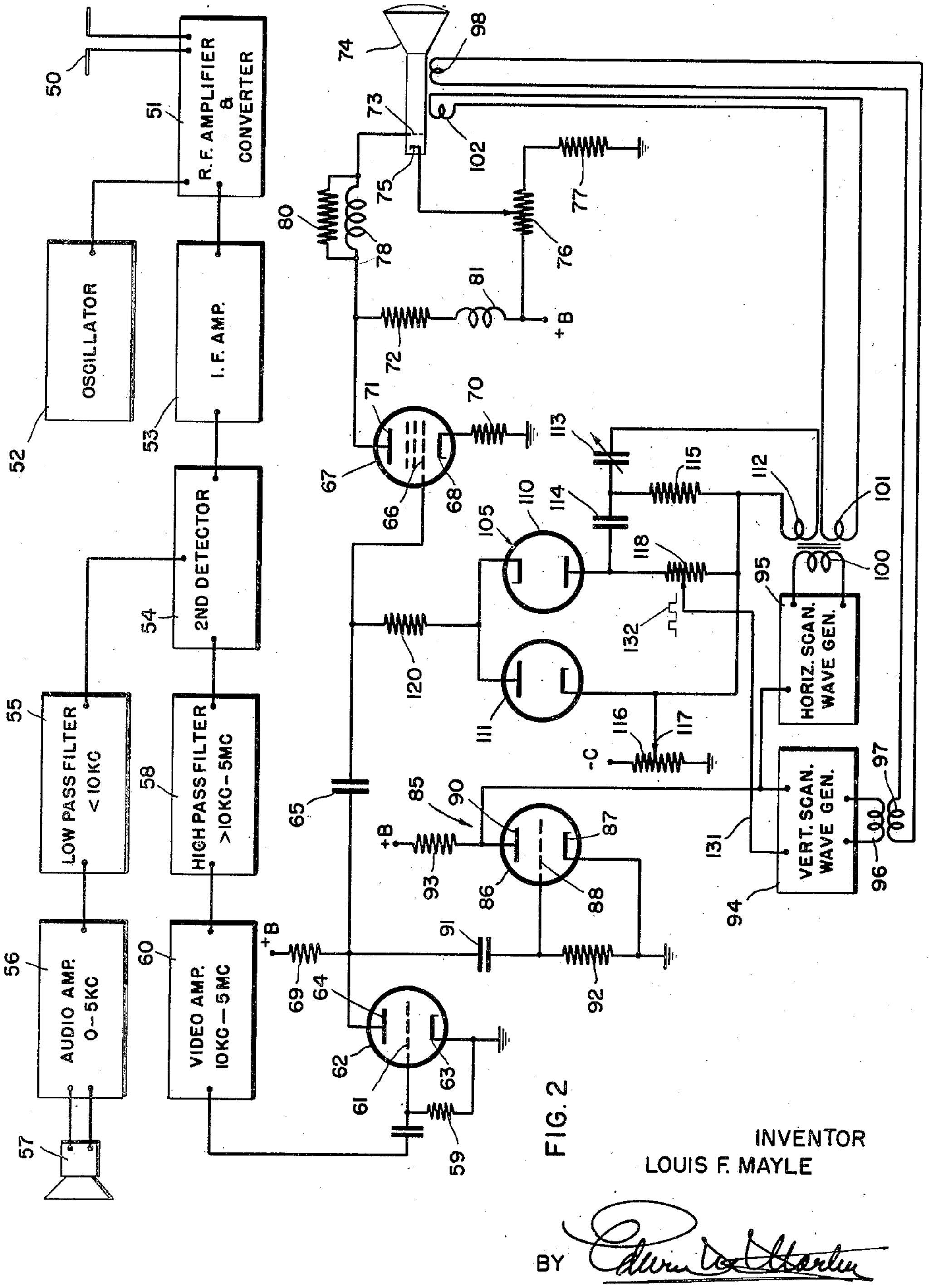
Fig. 2 is a schematic representation, partly in block form, of a television receiver in accordance with the invention.

Referring now to Fig. 2, there is illustrated a television receiver in accordance with the present invention comprising antenna 50 arranged for intercepting the modulated carrier wave radiated into space by antenna 42 of the transmitter of Fig. 1. The modulated carrier wave is amplified by radio frequency amplifier and converter 51 coupled to antenna 50. Local oscillator 52 is arranged for developing a sinusoidal wave of predetermined frequency which is mixed in converter 51 with the modulated carrier wave to derive a modulated wave of intermediate frequency. Connected in cascade to radio frequency amplifier converter 51 is intermediate frequency amplifier 53, where the intermediate frequency signal is amplified, and second detector 54 which serves for demodulating the intermediate frequency signal.

The demodulated signal derived from second detector 54 includes the audio signal, comprising frequencies below 10 kilocycles, and the composite video signal comprising frequencies above 10 kilocycles and including the synchronizing and blanking signals. The audio signal is segregated from the composite video signal by low pass filter 55 having an upper cutoff frequency of 10 kilocycles. The audio signal is then amplified by audio amplifier 56, connected to low pass filter 55, and reproduced by loud speaker 57.

High pass filter 58 is also connected to the output of second detector 54 and passes frequencies between 10 kilocycles and about 5 megacycles. Video amplifier 60 amplifies the composite video signal derived from high pass filter 58, and, preferably, has a flat band pass between 10 kilocycles and about 5 megacycles. The composite video signal derived from video amplifier 60, preferably, has a peak-to-peak voltage of 5 volts for 100% carrier modulation. The polarity of the video signal derived from video amplifier 60 is such that the white level of the video signal is positive with respect to the black level.

The composite video signal derived from video amplifier 60 is impressed upon grid 61 of penultimate video amplifier stage 62 which may be a triode as shown. Grid 61 has a grid leak resistor 59 connected to ground. Cathode 63 is grounded as shown and anode 64 is connected with a suitable voltage source indicated at B+ through anode resistor 69. The output signal developed across anode resistor 69 has the opposite polarity from the signal impressed upon control grid 61 and is coupled through condenser 65 to control grid 66 of last video amplifier stage 67 which may be a pentode as illustrated. Cathode 68 of amplifier 67 is connected to ground through resistor 70. Anode 71 of amplifier 67 is supplied through anode resistor 72 with a suitable anode voltage indicated at B+.

The signal developed across anode resistor 72 again has the same polarity as the signal impressed upon control grid 61 of penultimate video amplifier stage 62. Accordingly, the video signal developed across anode resistor 72 has a polarity so that the white level is positive with respect to the black level.

Anode 71 is conductively connected to control grid 73 of cathode ray tube 74 arranged as a picture signal reproducing tube. The conductive connection between anode 71 and control grid 73 is for a purpose to be explained hereinafter. Cathode 75 of cathode ray tube 74 is connected by a variable tap to resistor 76 having one terminal connected to the anode supply voltage B+ of amplifier 67, while its other terminal is connected through resistor 77 to ground. By varying the tap of resistor 76 the average potential between grid 73 and cathode 75 of cathode ray tube 74 may be varied, thereby to control the picture brightness in a manner well known in the art. Cathode 75 forms part of an electron gun, not illustrated, which is arranged for developing an electron beam and projecting it towards a luminescent target or picture screen arranged opposite cathode 75. The voltage supplies for the electron gun of cathode ray tube 74 and a second anode, which should be supplied with a potential more positive than that of either cathode 75 or control grid 73, have not been shown to avoid confusion.

It is well understood that the gain of an amplifier such as pentode 67 is reduced at high frequencies due to the shunting effect of the interelectrode and stray capacitances of tube 67. In order to compensate for this loss of gain at high frequencies a conventional shunt-series peaking system may be employed. To this end there is provided peaking coil 78 arranged in series between anode 71 of amplifier 67 and control grid 73 of cathode ray tube 74. Peaking coil 78 may be shunted by resistor 80. Shunt coil 81 is arranged in series with anode resistor 72 in the lead between the anode supply B+ and anode 71 of amplifier 67. If desired, the same shunt-series peaking arrangement may be used in the output circuit of amplifier 62. The series coil may be arranged between anode 64 and coupling condenser 65, while the shunt coil may be provided between the anode supply voltage B+ and anode 64.

The synchronizing signals are separated from the composite video signal by means of circuit 85 connected to the output of amplifier 62. The polarity of the composite video signal derived across anode resistor 69 is such that the synchronizing signals are positive with respect to the black level which, in turn, is more positive than the white level. Synchronizing signal separating circuit 85 includes amplifier 86 comprising cathode 87 connected to ground as shown, grid 88 and anode 90. The synchronizing signals are separated from the composite video signal by a grid leak network including condenser 91 connected between anode 64 and control grid 88 and grid leak resistor 92 arranged between control grid 88 and ground. Anode 90 is connected to a suitable anode supply voltage indicated at B+ through anode resistor 93. Grid 88 and cathode 87 of synchronizing signal separating tube 86 are used as a diode which rectifies the signal. The rectified average current flows through grid leak resistor 92 thus establishing the bias of synchronizing signal separating tube 86. The positive synchronizing signals drive control grid 88 more positive. The output signal of synchronizing signal separating tube 86 is developed across anode resistor 93 and comprises an amplified voltage wave corresponding to the synchronizing signals only. The time constant of the grid leak network including condenser 91 and grid leak resistor 92 is of the order of the horizontal synchronizing signal period, that is approximately $1/15{,}750$ second.

The synchronizing signals developed across anode resistor 93 of synchronizing signal separating tube 86 are used for controlling vertical scanning wave generator 94 and horizontal scanning wave generator 95. Generators 94 and 95 develop saw-tooth current waves at the field and line frequency, respectively. The output of vertical scanning wave generator 94 is impressed upon coil 96 magnetically coupled to coil 97 which, in turn, is connected to vertical deflecting coils 98. The output of horizontal scanning wave generator 95 is connected across coil 100 magnetically coupled to coil 101 which, in turn, is connected to horizontal deflecting coils 102. Accordingly, the electron beam developed by cathode ray tube 74 is deflected by deflecting coils 98 and 102 across the luminescent target in accordance with the field and line scanning frequencies.

As explained in connection with Fig. 1, the amplitude of the blanking signal is modulated at the transmitter in accordance with the low frequency video component so that the blanking pulses do not have equal amplitudes. The low frequency video information which is carried by the blanking pulses may be restored by bringing the amplitudes of the blanking pulses to a predetermined or reference level. To this end there is provided clamping circuit 105 which is arranged for bringing control grid 66 of last video amplifier stage 67 to a predetermined voltage substantially during the occurrence of the blanking pulses. This predetermined voltage to which control grid 66 is brought periodically is such that the output signal developed across anode resistor 72 will bias grid 73 of cathode ray tube 74 to or beyond cutoff.

Figure 3:
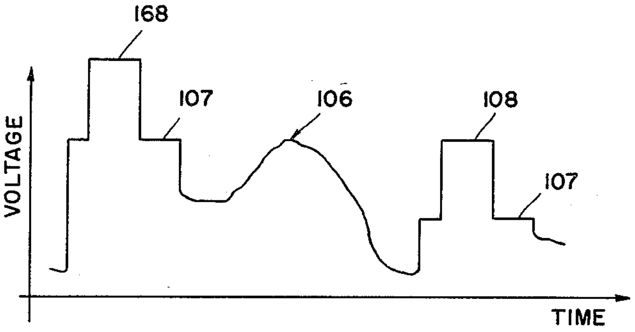
Figs. 3 to 5 are graphs which will be referred to in explaining the operation of the invention.

Referring now to Fig. 3, there is illustrated composite video signal 106 including blanking pulses 107 and horizontal synchronizing pulses 108. Composite video signal 106, as illustrated in Fig. 3, is developed across anode resistor 69 connected to penultimate video amplifier stage 62 and has such a polarity that the black level is positive with respect to the white level. Horizontal synchronizing pulses 108, in turn, are positive with respect to blanking signals 107. Composite video signal 106 is impressed upon control grid 88 of synchronizing signal separating tube 86. The same signal is also impressed upon control grid 66 of last video amplifier stage 67.

Clamping circuit 105 comprises inverted diodes 110 and 111 arranged in parallel. Tertiary coil 112 is magnetically coupled to output coil 100 of horizontal scanning wave generator 95. Therefore, pulses at the horizontal synchronizing frequency are impressed upon variable condenser 113 connected across coil 112 and upon condenser 114 connected in series between variable condenser 113 and the anode of diode 110. Resistor 115 has one terminal arranged between condensers 113 and 114 while its other terminal is connected to tertiary coil 112. A negative grid supply voltage indicated at C— is connected between resistor 116 and ground. By means of variable tap 117 connected to resistor 116 the negative voltage may be adjusted. Variable tap 117 is connected between resistor 115 and coil 112 and to the cathode of diode 111. Resistor 118 is arranged between the anode of diode 110 and variable tap 117. The cathode of diode 110 and the anode of diode 111 are connected together and through resistor 120 to control grid 66 of last video amplifier stage 67.

Clamping circuit 105 operates as follows. A positive pulse developed across tertiary coil 112 at the horizontal scanning frequency is impressed upon the anode of diode 110 through condensers 113 and 114. Current now flows through diodes 110 and 111 connected in series. Thereby, control grid 66 of last video amplifier stage 67 is brought to a predetermined potential which may be controlled by variable tap 117. As pointed out hereinbefore, this potential, preferably, is such that the output signal of last video amplifier stage 67 developed across anode resistor 72 will bias control grid 73 of cathode ray tube 74 to or beyond cutoff. Accordingly, every time a positive horizontal synchronizing pulse is developed across tertiary coil 112, control grid 73 is biased to cutoff.

During the time interval between two successive horizontal synchronizing pulses control grid 66 of last video amplifier stage 67 should be free to float so that it can readily follow the negative excursions of the video signal impressed thereon by coupling condenser 65. Therefore, any flow of current through diode 110 must be prevented during that time. To this end the anode of diode 110 should be kept during the trace interval at a voltage that will be more negative than any possible video signal. This is normally accomplished by condenser 114 which will impress a negative potential upon the anode of diode 110 upon the cessation of each positive pulse developed across tertiary coil 112. In order to prevent this negative potential from being dissipated through resistors 115 and 118, the time constant which is obtained by multiplying the capacitance of condenser 114 by the sum of the resistances of resistors 115 and 118 should be made large so that even after condenser 114 has partially discharged through resistors 115 and 118 the potential placed on the anode of diode 110 will still be sufficiently negative.

Variable condenser 113 is provided for the purpose of narrowing the positive pulses supplied to diodes 110 and 111. Resistor 115, preferably, has a resistance which is approximately 1/10 of that of resistor 118. For purposes of illustration representative values of a few of the circuit constants of synchronizing signal separating circuit 85 and clamping circuit 105 have been indicated in Fig. 2.

Figure 4:
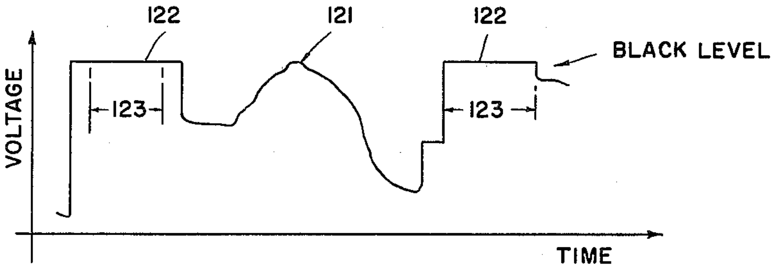

The action of clamping circuit 105 will be more readily understood by reference to Fig. 4 illustrating composite video signal 121 which is impressed upon control grid 66 of last video amplifier stage 67 due to the action of clamping circuit 105. Blanking pulses 122 now have their amplitudes at the same level which is determined by variable tap 117. Control grid 66 is clamped from the occurrence of the leading edge of horizontal synchronizing pulses 108 and the trailing edge of blanking pulses 122. The time interval during which control grid 66 is clamped is indicated in Fig. 4 by arrows 123. The clamping action may be clearly appreciated by a comparison of the second blanking pulse 107 of Fig. 3 with the corresponding second blanking pulse 122 of Fig. 4.

Thus, it will be seen that clamping circuit 105 acts to bring the amplitudes of blanking pulses 122 to the same level, thereby to restore the low frequency and D. C. video information in a manner well understood in the art. As may be observed by comparing the right hand portion of video signal 106 of Fig. 3 with the right hand portion of video signal 121 of Fig. 4, clamping circuit 105 acts to control the average level of the video signal, that is, the low frequency and D. C. video information. By conductively connecting anode 71 of last video amplifier stage 67 to control grid 73 of cathode ray tube 74, the low frequency and D. C. video information is passed on to control grid 73.

Examination of the wave form of composite video signal 121 shows that the leading edge of the second blanking pulse 122 shifts at some point to the leading edge of synchronizing pulse 108. This is due to the fact that clamping circuit 105 only begins to clamp control grid 66 with the occurrence of the leading edge of synchronizing pulses 108. Hence, a loss of blanking on the right edge of the picture screen of cathode ray tube 74 is produced. This defect may be eliminated by masking off a portion of the right edge of the picture screen. Alternatively, the leading edges of synchronizing signals 108 may be made coincident with the leading edges of blanking pulses 122 or 107 at the transmitter. At the receiver the synchronizing signals may be delayed by a time delay circuit arranged, for example, between synchronizing signal separating tube 86 and horizontal scanning wave generator 95 for the purpose of providing blanking at the right side of the picture screen.

Figure 5:
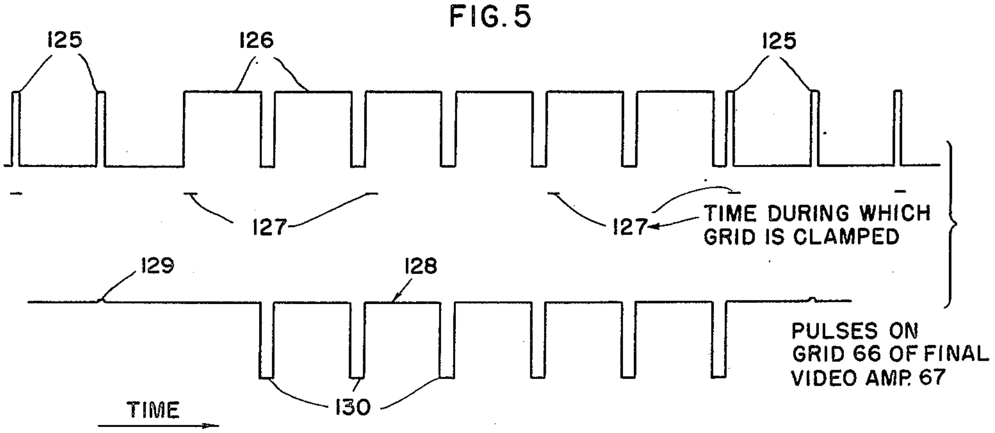

Control grid 66 of last video amplifier stage 67 will not be clamped during the entire period of the vertical synchronizing pulses. A portion of the vertical synchronizing pulses corresponding to the present television standards as adopted by the Radio Manufacturers Association is illustrated in Fig. 5. The vertical synchronizing pulses comprise two series consisting each of six narrow equalizing pulses 125 preceding and following a series of six broad-topped serrated pulses 126. Vertical synchronizing pulses 125 and 126 recur at twice the frequency of the horizontal synchronizing pulses 108. Accordingly, clamping circuit 105 will clamp control grid 66 during the periods of time indicated by horizontal lines 127 shown below vertical synchronizing pulses 125 and 126.

Curve 128 illustrates the voltage impressed upon control grid 66 during the vertical retrace period. Every second narrow equalizing pulse 125 will produce a short positive pulse or kick 129 on control grid 66 which, however, will drive control grid 73 of cathode ray tube 74 beyond cutoff so that the electron beam can not reach the luminescent target. The notches between the broad vertical synchronizing pulses 126 will appear as negative pulses 130 on control grid 66 which will produce short white lines on the picture screen of cathode ray tube 74 during the initiation of the vertical retrace, one set of lines appearing at the center of the picture screen and another set at the right edge thereof.

In order to eliminate these undesired lines a positive pulse is injected into clamping circuit 105 during the vertical retrace period. To this end lead 131 is connected between vertical scanning wave generator 94 and a tap on resistor 118. Thus, positive pulses 132 are fed to clamping circuit 105 so that diodes 110 and 111 conduct current thereby to clamp control grid 66 during the entire vertical retrace period. Pulses 132 may be either taken from the grid of the vertical scanning wave generating tube or from the plate of the output tube. In the latter case a condenser, not illustrated, may be connected between the output of the vertical scanning wave generating tube and lead 131.

Occurrence of the white lines above referred to during the vertical retrace period may also be prevented by separating or clipping the synchronizing signals from the composite video signal between video amplifiers 62 and 67. In that case lead 131 may be dispensed with. Control grid 73 of cathode ray tube 74 will then be biased to cutoff during the entire vertical retrace period.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a television receiver adapted to receive a composite television signal comprising a video signal, a blanking signal including pulses, a horizontal synchronizing signal, and a vertical synchronizing signal including periodically recurring groups of pulses, a picture signal reproducing tube having a control grid, a video amplifier chain including a last amplifier stage having a control grid, said last amplifier stage being conductively connected to said picture tube control grid, means for impressing said television signal upon said amplifier chain, a horizontal scanning generator controlled by said horizontal synchronizing signal, a vertical scanning generator controlled by said vertical synchronizing signal; and a clamping circuit coupled to said amplifier control grid for periodically bringing said amplifier control grid to a predetermined fixed potential substantially during the occurrence of said blanking pulses and substantially during the entire period of the occurrence of each group of said vertical synchronizing pulses, said clamping circuit including a first and a second diode, each having an anode and a cathode, the anode of said first diode being connected to the cathode of said second diode, means connecting the junction point of said diodes to said amplifier control grid, a source of voltage, means for connecting said voltage source to the cathode of said first diode, a resistor connecting the cathode of said first diode to the anode of said second diode, means coupling said horizontal scanning generator to the anode of said second diode to impress a positive horizontal synchronizing pulse on said second diode to bring said amplifier control grid to a predetermined potential determined by said voltage source substantially during the occurrence of said blanking pulses, and means coupling said vertical scanning generator to said resistor for impressing a positive pulse substantially during the entire period of the occurrence of each group of said vertical synchronizing pulses upon said second diode.

2. In a television receiver adapted to receive a composite television signal comprising a video signal, a blanking signal including pulses, a horizontal synchronizing signal, and a vertical synchronizing signal including periodically recurring groups of pulses, a picture signal reproducing tube having a control grid, a video amplifier chain including a last amplifier stage having a control grid, a first condenser connected to said amplifier control grid, said last amplifier stage being conductively connected to said picture tube control grid, means for impressing said television signal upon said amplifier chain, a horizontal scanning generator controlled by said horizontal synchronizing signal, a vertical scanning generator controlled by said vertical synchronizing signal; and a clamping circuit connected to said amplifier control grid for periodically bringing said amplifier control grid to a predetermined fixed potential substantially during the occurrence of said blanking pulses and substantially during the entire period of the occurrence of each group of said vertical synchronizing pulses, said clamping circuit including a first and a second diode, each having an anode and a cathode, the anode of said first diode being connected to the cathode of said second diode, a first resistor for connecting the junction point of said diodes to said amplifier control grid, a source of voltage, means for connecting said voltage source to the cathode of said first diode, a second resistor connecting the cathode of said first diode to the anode of said second diode, a further condenser for coupling said horizontal scanning generator to the anode of said second diode to impress a positive horizontal synchronizing pulse on said second diode to bring said amplifier control grid to a predetermined potential determined by said voltage source substantially during the occurrence of said blanking pulses, a means coupling said vertical scanning generator to said second resistor for impressing a positive pulse substantially during the entire period of the occurrence of each group of said vertical synchronizing pulses upon said second diode.

LOUIS F. MAYLE.

REFERENCES CITED

The following references are of record in the file of this patent:

UNITED STATES PATENTS

| Number | Name | Date |
|---|---|---|
| 2,225,741 | Guanella | Dec. 24, 1940 |
| 2,244,240 | Blumlein | June 3, 1941 |
| 2,266,194 | Guanella | Dec. 16, 1941 |
| 2,295,330 | Blumlein | Sept. 8, 1942 |
| 2,300,942 | Lewis | Nov. 3, 1942 |
| 2,307,249 | Willians | Jan. 5, 1943 |
| 2,307,375 | Blumlein | Jan. 5, 1943 |
| 2,342,943 | Kell | Feb. 29, 1944 |
| 2,402,091 | Schade | June 11, 1946 |
| 2,403,549 | Poch | July 9, 1946 |

FOREIGN PATENTS

| Number | Country | Date |
|---|---|---|
| 507,668 | Great Britain | June 20, 1939 |